United States Patent

Binzel et al.

Patent Number: 5,278,832
Date of Patent: Jan. 11, 1994

[54] METHOD AND APPARATUS FOR CONTROLLING THE TIMING WITHIN A TRANSCEIVER

[75] Inventors: Charles P. Binzel, Hoffman Estates; Daniel J. DeClerck, Algonquin; Christopher F. Bussan, Rolling Meadows, all of Ill.

[73] Assignee: Motorola, Inc., Schaumburg, Ill.

[21] Appl. No.: 632,236

[22] Filed: Dec. 20, 1990

[51] Int. Cl.⁵ .................................. H04J 3/16
[52] U.S. Cl. ...................... 370/95.3; 370/77; 370/104.1
[58] Field of Search ............ 370/95.3, 95.1, 100.1, 370/105.3, 108, 77, 104.1, 109; 375/119, 120, 107; 342/358, 372

[56] References Cited

U.S. PATENT DOCUMENTS

| | | | |
|---|---|---|---|
| 4,305,045 | 12/1981 | Metz et al. | 375/120 |
| 4,327,436 | 4/1982 | Ohara et al. | 370/110.1 |
| 4,392,224 | 7/1983 | Mori et al. | 370/67 |
| 4,397,018 | 8/1983 | Fennel, Jr. et al. | 370/104 |
| 4,445,118 | 4/1984 | Taylor et al. | 342/356 |
| 4,523,155 | 6/1985 | Walczak et al. | 330/279 |
| 4,569,063 | 2/1986 | Perry | 370/105.3 |
| 4,712,212 | 12/1987 | Takai et al. | 370/104 |
| 4,733,240 | 3/1988 | Bradley | 342/372 |
| 4,742,514 | 5/1988 | Goode et al. | 370/85 |
| 5,014,344 | 5/1991 | Goldberg | 375/107 |
| 5,027,126 | 6/1991 | Basehgi et al. | 342/372 |
| 5,028,885 | 7/1991 | Voigt et al. | 375/120 |
| 5,042,082 | 8/1991 | Dahlin | 370/95.1 |

Primary Examiner—Douglas W. Olms
Assistant Examiner—Shick Hom
Attorney, Agent, or Firm—Kirk W. Dailey; F. John Motsinger; Rolland R. Hackbart

[57] ABSTRACT

A radio transceiver (119) including a transmitter (111), a receiver (107), and a controller (113). The controller (113) creates a fixed period reference signal (201) and a second reference signal (203) which has a variable delay in time from the fixed period reference signal (201). In addition the controller (113) creates a plurality of control signals used to control parts of the transceiver (119) and which are time dependant upon the second reference signal 203). Therefore, the adjusting of the variable delay of the second signal subsequently adjusts the plurality of control signals.

8 Claims, 4 Drawing Sheets

METHOD AND APPARATUS FOR CONTROLLING THE TIMING WITHIN A TRANSCEIVER

FIELD OF THE INVENTION

This invention generally relates to Time Division Multiple Access (TDMA) communication systems and more specifically relates to controllers for transceivers contained within a TDMA communication system.

BACKGROUND OF THE INVENTION

In a TDMA communication system, a given radio frequency channel is divided into multiple time slots. A given transceiver in a TDMA communication system is assigned specific timeslots during which the transceiver can transmit information and specific timeslots during which the transceiver receiver desired information. This requires the transmitter and receiver to be turned on and off at different times.

In a digital telephone system, such as the system specified by the Group Special Mobile (GSM) committee, there is a requirement for the mobile transceivers to maintain synchronization to multiple fixed site transceivers. The mobile transceiver must track the difference in time delay between the mobile transceiver and each fixed-site transceiver with which it maintains synchronization. The GSM digital telephone system is also required to monitor the power levels of adjacent fixed site transceivers, using this information to choose the most appropriate fixed-site transceiver when the signal strength of the current fixed-site transceiver dwindles. These requirements generate a need for a complex set of signals to allow the transceiver hardware to switch quickly between radio frequencies of different fixed-site receivers and to adapt quickly to time shifts of each fixed-site transceiver.

Generally, complex sets of control signals are generated using complex specialized hardware with software maintaining the control signals. The software required a significant amount of calculations prior to generation of each signal and a significant amount of intervention with the specialized hardware. Typically, in technology today there is a need for reduction in size, power consumption and cost. This need is magnified in a portable or a mobile digital telephone because of the increased amount of circuitry required over a standard portable or mobile analog radiotelephone. Therefore, a need exists for a transceiver controller which can fulfill the complex requirements of operating in a TDMA communication systems environment with a minimal amount of software intervention from a microprocessor. This will free up space for other computations in the microprocessor and will ultimately reduce the size and cost of the communication device.

SUMMARY OF THE INVENTION

The present invention encompasses a method and apparatus for controlling a radio transceiver including a transmitter, a receiver, and a controller. The controller creates a fixed period reference signal and a second reference signal which has a variable delay in time from the fixed period reference signal. Additionally the controller creates a plurality of control signals time dependent upon the second reference signal and controlling the functions of the transceiver. Thus, adjusting the variable delay of the second reference signal adjusts the timing of the plurality of control signals.

DESCRIPTION OF A PREFERRED EMBODIMENT

Figure 1:
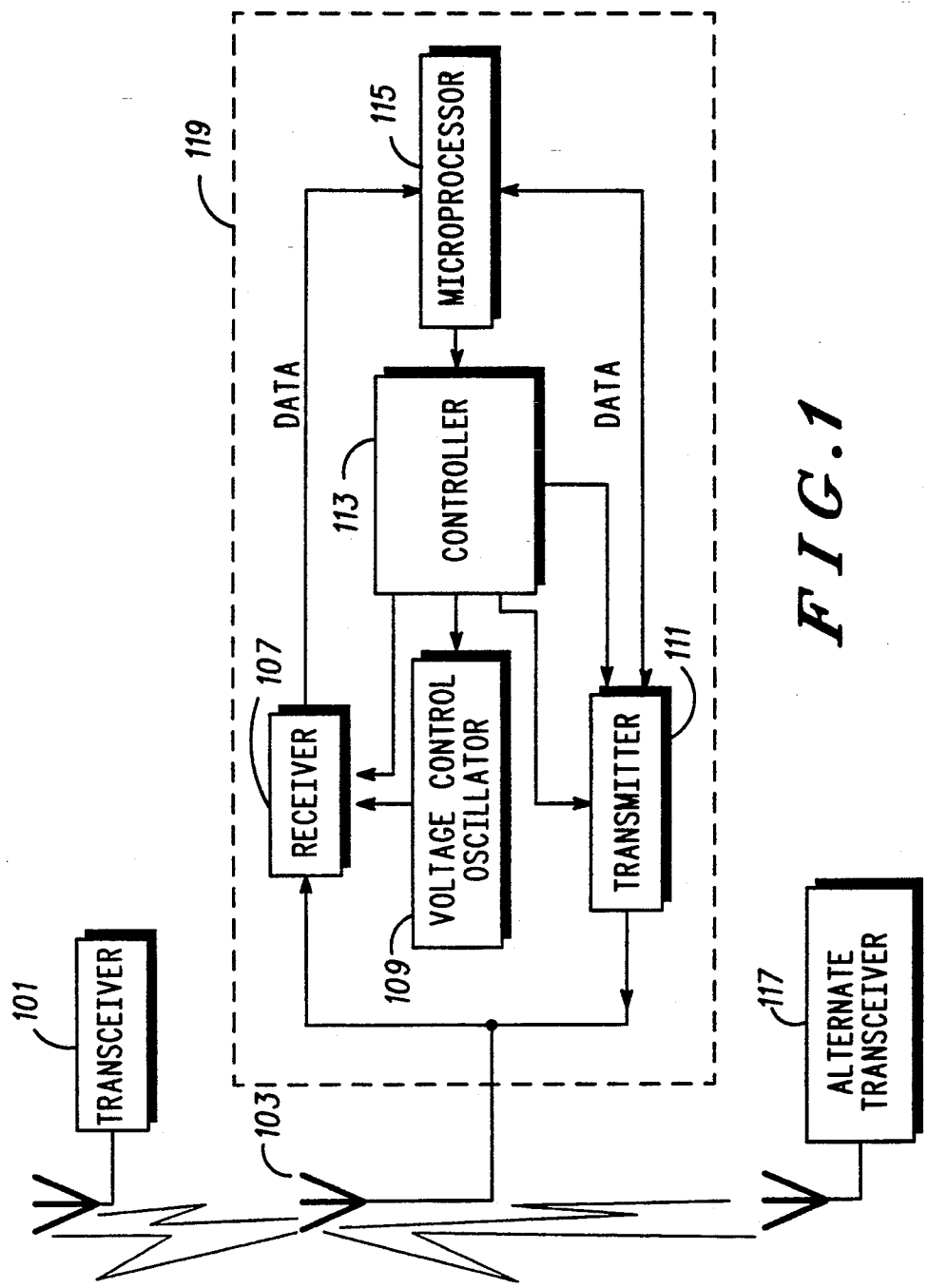
FIG. 1 is a block diagram of a radio frequency transmission system.

FIG. 1 shows a block diagram of a TDMA radio communications system, such as a European digital radiotelephone system specified by the Group Special Mobile (GSM) committee. The system is essentially comprised of one serving fixed site transceiver 101, one alternate fixed-site transceiver 117 and a mobile or portable transceiver 119. The mobile or portable transceiver 119, hereinafter referred to as the remote transceiver 119, is contained within a digital radiotelephone as specified by the GSM committee. The serving fixed-site transceiver 101 uses at least one specified radio frequency (RF) channel divided into at least eight timeslots to communicate with the remote transceiver 119 and other remote transceivers which are within the serving range of the serving fixed-site transceiver 101. The remote transceiver 119 monitors the power levels of the alternate fixed-site transceivers within a given area including the alternate fixed-site transceiver 117. The remote transceiver 119 also remains synchronized with six adjacent fixed-site transceivers. The synchronization is maintained and the power measurements are taken so when the remote transceiver 119 needs to switch to another fixed-site transceiver the remote transceiver may utilize the best alternate fixed-site transceiver 117 without losing desired data.

The remote transceiver 119 contains a receiver 107, a transmitter 111, a voltage controlled oscillator (VCO) 109, a transceiver controller 113 and a microprocessor 115, the microprocessor 115 and the controller 113 can be integrated into a microcontroller such as a MC68332 available from Motorola, Inc. The receiver 107 is responsible for demodulating RF signals received by the antenna 103 from multiple fixed-site transceivers 101, 117 having multiple carrier frequencies. The VCO 109 is responsible for adjusting its output frequency to the desired carrier frequency which the receiver 107 needs to receive. Data from the digital radiotelephone is input into the transmitter 111 to be sent to the serving fixed-site transceiver 101. The transmitter 111 digitally modulates the data with the appropriate carrier frequency, amplifies the data and sends it to the serving fixed-site transceiver 101 via the antenna 103.

Figure 2:
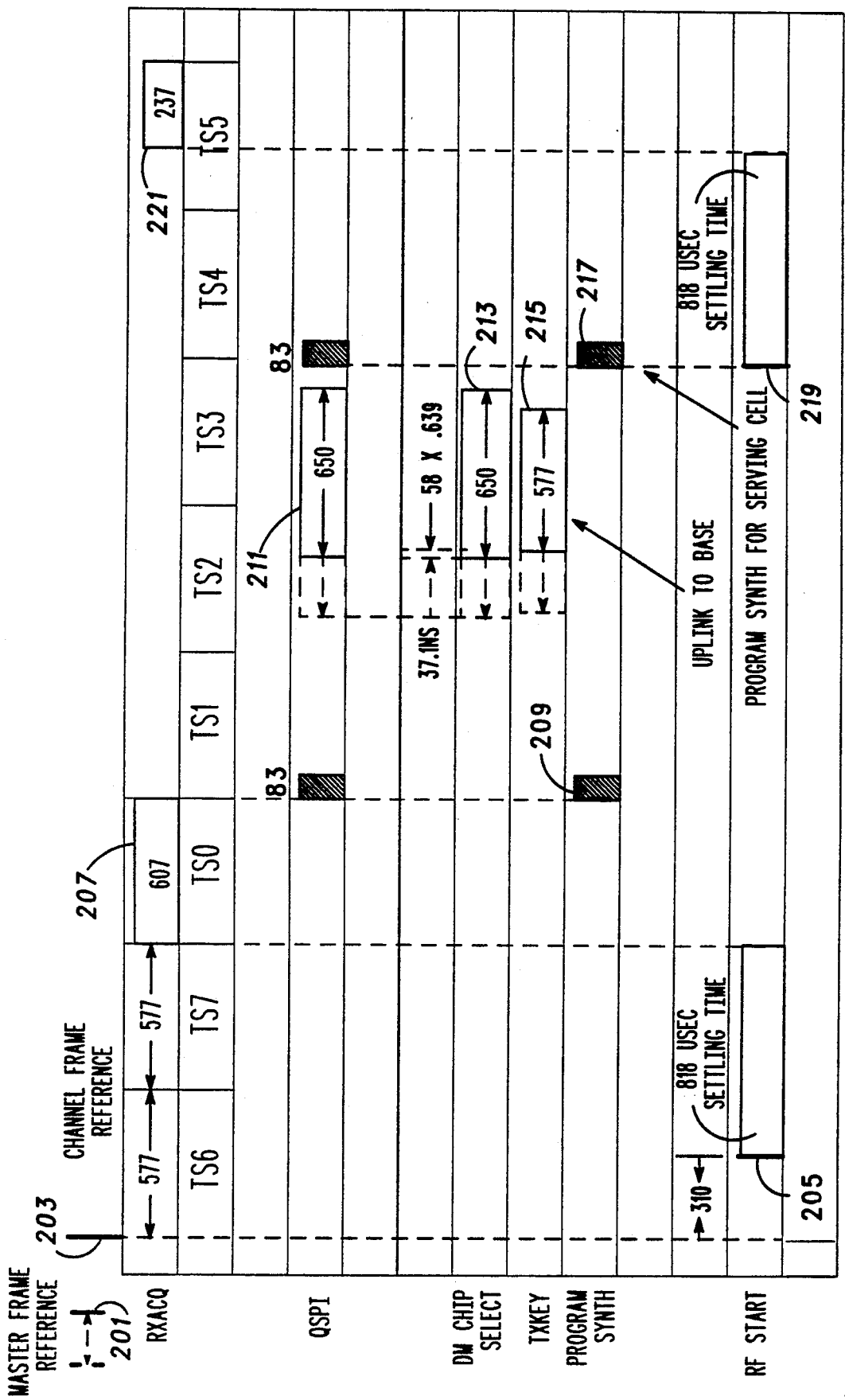
FIG. 2 is a timing diagram of the control signals utilized in a transceiver which may employ the present invention.

The controller 113 and the microprocessor 115 work together to maintain synchronization between the remote transceiver 119 and the fixed-site transceivers 101, 117, and control the internal timing to transmit and receive data. FIG. 2 reveals the timing of the control signals involved. First, the controller 113 creates a master frame reference signal 201. In the preferred embodiment, the master frame reference signal 201 has a period of 4.615 millisec. The master frame reference signal 201 is the fixed reference signal from which all other control and reference signals are based.

For each fixed-site transceiver 101, 117 synchronized to the remote transceiver 119, there is a channel frame reference signal 203. All subsequent control signals for an individual channel reference themselves in time to the channel from reference signal 203. The delay between the channel frame reference signal 203 and the master frame reference signal 201 is adjusted once during each period of the master frame reference signal 201 for changes in propagation delay of the RF signals transmitted and received between the remote transceiver 119 and the serving fixed site transceiver 101.

The RFSTART control signal 205 has two fixed delay times from the channel frame reference signal 203, the first fixed delay time (310 microsec) is the length of time until receiving the data from the serving fixed-site transceiver 101, the second fixed delay time (3.5 millisec) is the length of time until measuring the signal strength of an adjacent fixed-site transceiver 117. The length of time that the RFSTART control signal 205 is asserted is not pertinent to the design, therefore, no microprocessor 115 computations are necessary to create this control signal. The changes in the timing are controlled by the changes made to the channel frame reference signal 203. The RFSTART control signal 205 precedes the RXACQ control signal 207 and functions as a preparation signal to the receiver section. The preparations include loading the synthesizer and the automatic gain control (AGC) level information into the receiver. The RXACQ control signal 207 follows the RFSTART control signal 205 by the length of time equal to the worst case locking time of the synthesizer, 818 microsec. The length of time RXACQ control signal 207 is asserted is the length of time that the receiver processes the received RF signals via the antenna 103. There are two different assertion times for the RXACQ control signal 207 in this embodiment. Namely, the first time (607 microsec) is the length to receive one timeslot of data from the serving fixed-site transceiver 101. The second time (237 microsec) is equal to the length of time required to receive enough information to determine the signal strength of an adjacent fixed-site transceiver 117.

The DMCS control signal 213 starts the digital modulator in the transmitter 111 prior to a transmission of data to the serving fixed site transceiver 101. The delay of the DMCS control signal 213 is referenced to the channel frame reference signal 203 and is different for each fixed-site transceiver. The fixed-site transceiver sends the remote transceiver 119 the delay information prior to transmission. This delay is programmed into the controller 113 by the microprocessor 115. The DMCS control signal 213 is asserted (650 microsec) prior to, during and after the transmission period of the transmitter 111. The TXKEY control signal 215 determines the length of the transmission period, 577 microsec. The TXKEY control signal has a fixed delay of 37.1 microsec from the asserting edge of the DMCS control signal 213, this fixed delay is the worst case time for the transmitter to adjust properly.

The timing of the aforementioned signals are specific to the hardware chosen for the design, and a person of average skill in the art would appropriately adjust these times for their design.

There are two interrupts necessary for the microprocessor 115 to program the controller 113 for proper operation of the remote transceiver 119. The first interrupt 211 sets the proper time delay between the master frame reference signal 201 and the channel frame reference 203, sets the delay between the channel frame reference 203 and RFSTART control signal 205 to the first fixed delay and the RXACQ control signal assertion time to the first fixed time for receiving the data from the serving fixed-site transceiver 101. The second interrupt 209 sets RFSTART control signal 205 to the second fixed delay and the RXACQ control signal assertion time to the second fixed time for measuring the signal strength of the adjacent fixed-site transceiver 117.

Figure 3A:
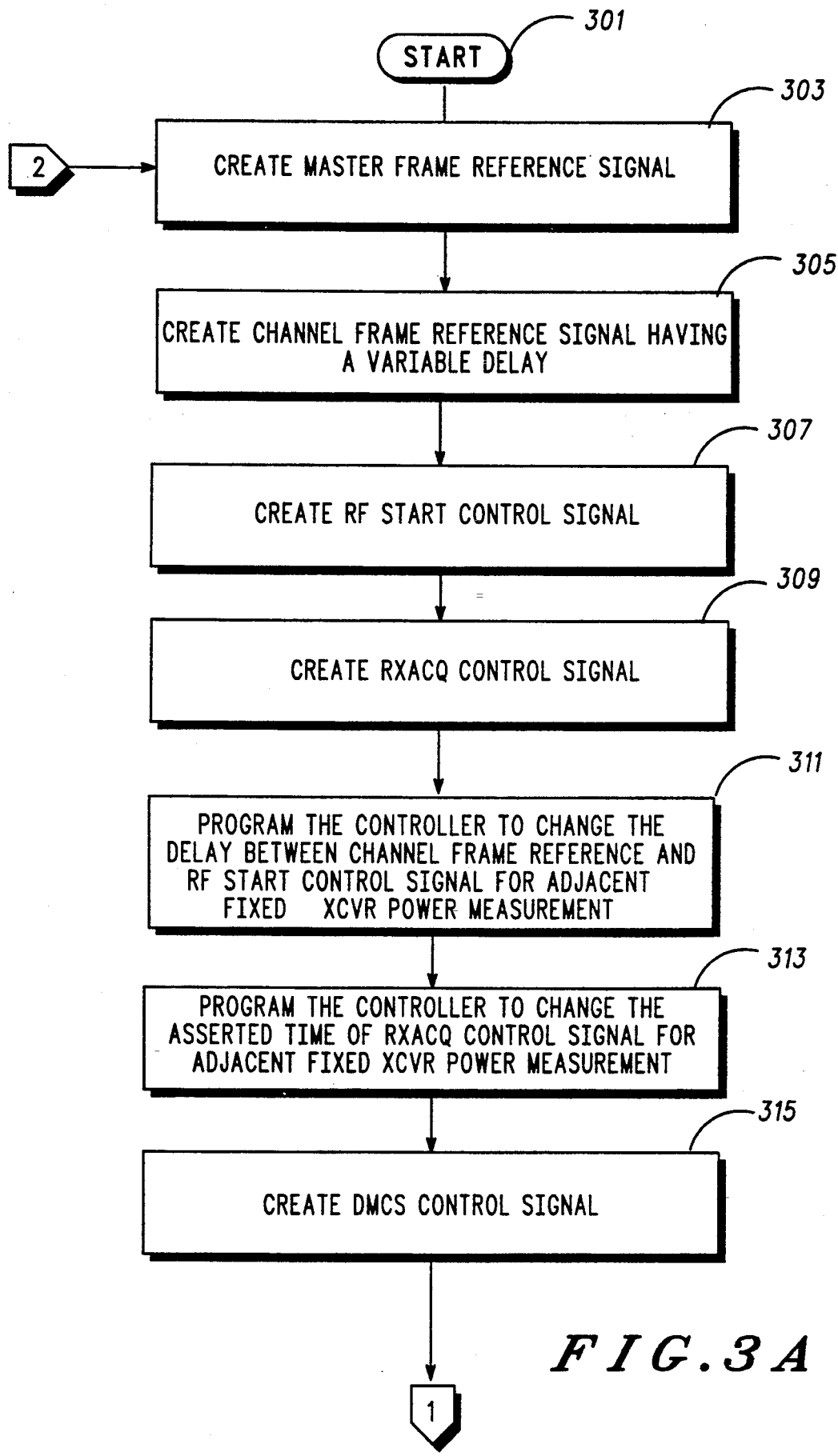
FIGS. 3A and 3B are a flowchart of the process used by a transceiver controller which may employ the present invention.
Figure 3B:
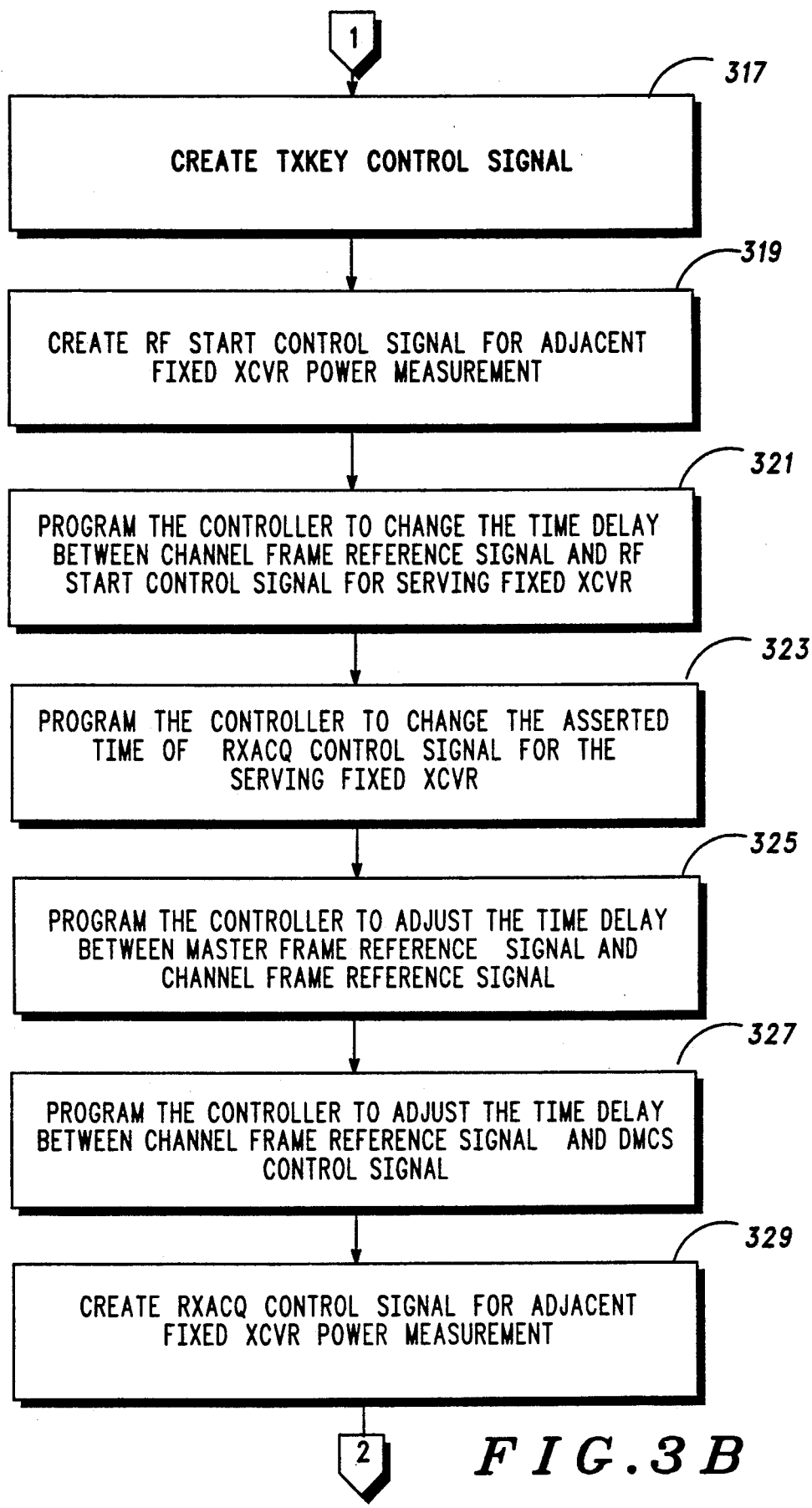

FIG. 3 is a flow chart of the controller's process for controlling the remote transceiver 119. At function block 303, master frame reference signal 201 is created. At function block 305 the channel frame reference signal 203 is created. At function block 307, the RFSTART control signal 205 is created to set up the receiver 107 for attaining RF signals from the serving fixed-site transceiver 101. At function block 309, the RXACQ signal 207 is asserted for acquiring the RF signals. The microprocessor is then interrupted to program the controller for measuring the signal strength of the adjacent fixed-site transceiver 117. First, function block 311 sets the delay between the channel frame reference signal 303 and RFSTART control signal 205. Second, function block 313 sets the RXACQ control signal assertion time to the second fixed time. The DMCS control signal 213 is asserted for the entire transmission period at 315 and TXKEY control signal 215 is asserted 37.1 microsec later at 317. Next, the RFSTART control signal 205 is created to set up the receiver 107 for measuring the signal strength from the adjacent fixed-site transceiver 117 at 319. The microprocessor 115 is then interrupted to program the controller 113 for receiving data from the fixed-site transceiver 101. First, the microprocessor 115 sets the delay between the channel frame reference signal 203 and RFSTART control signal 205 at function block 321. Second, the microprocessor sets the RXACQ control signal assertion time to the first fixed time at 323. Then, the microprocessor 115 adjusts the delay between the master frame reference signal 201 and the channel frame reference signal 203 at 325. At 327 the microprocessor 115 adjusts the time delay between the channel frame reference signal 203 and the DMCS control signal 213. The controller 113 then creates the RXACQ signal to measure the signal strength of the adjacent fixed-site transceiver 117. The process then repeats.

What is claimed is:

1. A method of controlling the timing of a TDMA (time division multiple access) transceiver, the transceiver including a transmitter, a receiver, and a controller, the method comprising the steps of:

creating a first reference signal having a first fixed period;

creating a second reference signal having a second fixed period and a variable delay in time from said first reference signal;

creating a plurality of control signals having fixed delays in time from said second reference signal; and adjusting said second reference signal's variable delay in time, such that said plurality of control signals are adjusted in time.

2. A method of controlling the timing of a Time Division Multiple Access (TDMA) transceiver, the transceiver including a transmitter, a receiver, a controller, and a microprocessor each disposed within a radiotelephone, the method comprising the steps of:

creating a first reference signal with a fixed period in the controller;

creating a second reference signal having a second fixed period and a variable delay in time from said first reference signal in the controller;

creating, in the controller, a first control signal having a first fixed delay in time from said second reference signal, such that the receiver is programmed to receive a first radio frequency for a duration of time determined by an assertion time value;

creating, in the controller, a second control signal having a fixed delay in time from said first control signal, during which the receiver acquires data;

programming the controller from the microprocessor such that said first control signal has a second fixed delay in time from said second reference signal;

programming the controller from the microprocessor such that said assertion time value has a second time value;

creating, in the controller, a third control signal having a variable delay in time from said second reference signal, such that the digital modulator is activated;

creating, in the controller, a fourth control signal having a fixed delay in time from said second reference signal, such that the transmitter is activated;

creating, in the controller, said first control signal having said second fixed delay in time from said second reference signal, such that, the receiver is programmed to receive a second radio frequency for a duration of time determined by said assertion time value;

programming the controller from the microprocessor such that said first control signal has said first fixed delay in time from said second reference signal;

programming the controller from the microprocessor such that said assertion time has a first time value;

programming the controller from the microprocessor such that said second reference signal has a second variable delay in time;

programming the controller from the microprocessor such that said third control signal has a second variable delay in time; and creating, in the controller, said second control signal a second time having said fixed delay in time from said first control signal, said first control signal having said second fixed delay in time.

3. A method of controlling the timing of a Time Division Multiple Access (TDMA) transceiver in accordance with claim 1, wherein said first clock signal is the master frame reference signal and said second clock signal is the channel frame reference signal.

4. A TDMA (time division multiple access) radio system including at least a first and a second fixed-site transceiver, a first remote transceiver, said TDMA radio system comprising:

first means for communicating between the first fixed-site transceiver and the first remote transceiver, said first means for communicating having a first propagation delay;

second means for communicating between the second fixed-site transceiver and the first remote transceiver, said second means for communicating having a second propagation delay; and a timing controller disposed within the first remote transceiver comprising:

first means for generating a first clock signal, second means for generating a second clock signal synchronized to said first clock signal and having a reconfigurable fixed delay from said first clock signal related to said first propagation delay, third means for generating a plurality of control signals having fixed delays in time from said second clock signal, and means for reconfiguring said reconfigurable fixed delay responsive to said second propagation delay during communications between the first remote transceiver and the second fixed-site transceiver.

5. A time division multiple access (TDMA) radio system in accordance with claim 4 wherein said means for reconfiguring is further responsive to changes in said first propagation delay during communications between the first remote transceiver and the first fixed-site transceiver.

6. A method of controlling the timing of a Time Division Multiple Access (TDMA) transceiver, the transceiver including a transmitter, a receiver, and a controller, the method comprising the steps of:

creating a first clock signal having a fixed period, wherein said fixed period does not exceed nine (9) milliseconds;

creating a second clock signal synchronized to said first clock signal and having a reconfigurable fixed delay from said first clock signal;

creating a plurality of control signals having fixed delays in time from said second clock signal; and reconfiguring said second clock signal's fixed delay in time, such that said plurality of control signals are adjusted in time.

7. A method of controlling the timing of a Time Division Multiple Access (TDMA) transceiver in accordance with claim 6 wherein said fixed period is equal to 4.615 milliseconds.

8. A method of controlling the timing of a TDMA transceiver in accordance with claim 1 wherein said first and said second fixed periods are equal to 4.615 milliseconds.

* * * * *